United States Patent [19]

Kurosaki

[11] 4,002,822
[45] Jan. 11, 1977

[54] STRAIN RELIEF GROMMET
[75] Inventor: Mutsuo Kurosaki, Moriguchi, Japan
[73] Assignee: NIFCO Inc., Tokyo, Japan
[22] Filed: July 22, 1976
[21] Appl. No.: 707,808
[30] Foreign Application Priority Data
July 24, 1975 Japan .................... 50-101711
[52] U.S. Cl. .................... 174/153 G; 16/2; 248/56
[51] Int. Cl.² ............... H01B 17/26; H01R 13/58; F16L 5/00
[58] Field of Search ............ 174/65 G, 135, 152 G, 174/153 G; 16/2; 24/73 S; 248/56; 339/103 R, 103 B, 105, 107

[56] References Cited
UNITED STATES PATENTS

| 2,424,759 | 7/1947 | Klumpp, Jr. | 174/153 G |
| 3,141,062 | 7/1964 | Rapata | 174/153 G |
| 3,424,856 | 1/1969 | Coldren | 174/153 G |

Primary Examiner—Laramie E. Askin
Attorney, Agent, or Firm—Jack R. Halvorsen; Robert W. Beart

[57] ABSTRACT

Disclosed is a grommet made of a synthetic resin, which comprises two members adapted to be coupled into embracing engagement, said members each provided at the opposed end portions thereof with a pair of inclined protrusions of which the directions of inclined edges, when observed in front elevation, cross each other. When said two members of the grommet are coupled with each other, therefore, said inclined protrusions closely approach each other at both said end portions so as to firmly grip a cord passed between the two members and said close mutual approach of the inclined protrusions causes the cord to twist itself between one end portion and the other end portion of the coupled members because of said crossed relationship of the directions of the inclined edges of said protrusions. This twist in the cord serves the purpose of preventing the cord from freely moving in the direction of its length.

1 Claim, 7 Drawing Figures

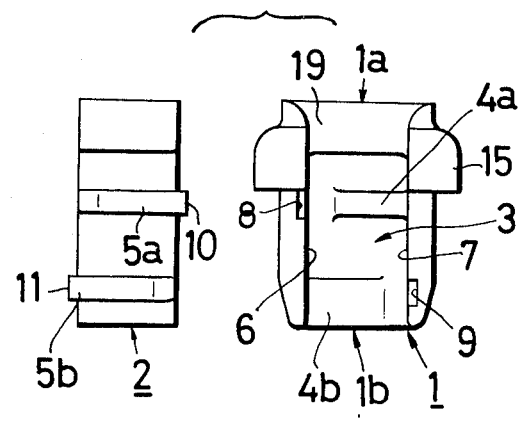
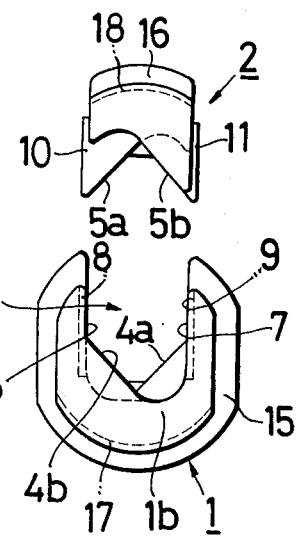
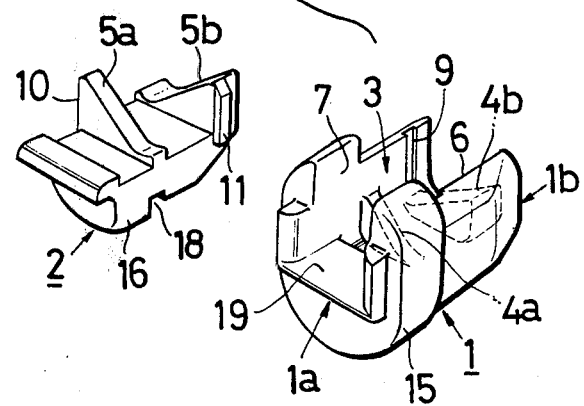
Fig. 1
Fig. 2
Fig. 3

STRAIN RELIEF GROMMET

BACKGROUND OF THE INVENTION

This invention relates to a strain relief grommet. More particularly, this invention relates to grommet made of a thermoplastic synthetic resin such as nylon and used in fastening a power supply cord onto a perforation bored such as in a chassis of an electric appliance, for the purpose of ensuring insulation of the cord from the chassis, preventing the coat of the cord from being damaged by the abrasion thereof against the edge of the perforation and protecting the cord from being pulled out of electric contact with the electric appliance by an external force applied thereto.

Various suggestions have been made concerning grommets of this type. Generally grommets of this type are composed of two members which are adapted to firmly hold the cord passed therebetween when they are coupled into embracing engagement and the cord, by virtue of this firm grip by the two members, is fastened against the perforation bored in the chassis. In the grommet proposed heretofore, a depression is formed in one of the two members and a protrusion is formed on the other member so that the depression and the protrusion are brought into matched engagement by coupling the two members with each other and the cord passed therebetween is forcibly bent and fastened in position in the shape of a crank or wave.

In the grommet of the aforementioned construction, however, since the cord is bent in the shape of a crank or wave in an extremely short space in which the cord passes the members of a limited length, excessive strain develops in the cord and causes the coat of the cord to peel off or, occasionally, the core wires are broken. Particularly since the catching claws formed on the outer surface of the two members are forcibly passed through the perforation in the chassis and brought into biting engagement therewith when the grommet is to be attached to said perforation, the force with which the cord is bent is increased more than is necessary and the possibility of breaking the cord is proportionally increased.

An object of this invention is to provide a grommet which is capable of preventing the cord passed therein from freely moving in the direction of its length without requiring the cord to be forcibly bent.

Another object of this invention is to provide a grommet which is designed to facilitate the work of cord gripping and the work of fastening the grommet into the perforation such as in the panel.

SUMMARY OF THE INVENTION

To accomplish the objects described above according to the present invention, there is provided a grommet which comprises two members adapted to be coupled into embracing engagement, said members each provided at the opposed end portions thereof with a pair of inclined protrusions of which the directions of the inclined edges, when observed in front elevation, cross each other. When said two members of the grommet are coupled with each other, therefore, said inclined protrusions closely approach each other at both said end portions so as to firmly grip a cord passed between the two members and said close mutual approach of the inclined protrusions causes the cord to twist itself between one end portion and the other end portion of the coupled members because of said crossed relationship of the directions of the inclined edges of said protrusions.

The cord is passed between the two members, therefore, is held in a twisted state by the pair of inclined protrusins of which the directions of inclined edges, when observed in front elevation, cross each other. Thus, the cord can be prevented from movement in the direction of its length without requiring forcible bending or entailing broken core wires or damaged coat of cord. Further since the two members are provided each with a pair of inclined protrusions of which the directions of the inclined edges, when observed in front elevation, cross each other, the coupling of the two members can be attained and the cord can be bent in a twisted state simply by pressing the two members against each other with the cord interposed therebetween and the fastening of the cord to the panel can be easily obtained by inserting the assembled grommet in conjunction with the cord through the perforation such as in the panel. These objects and the other objects and characteristic features of the present invention will become apparent from the description to be given hereinbelow with reference to the accompanying drawing.

BRIEF DESCRIPTION OF THE DRAWING

FIG. 1 is a bottom view of the two members in one preferred embodiment of the grommet according to this invention.

FIG. 2 is a front view of the grommet of FIG. 1 in its separated state.

FIG. 3 is a perspective view of the grommet in its separated state.

Figure 4:
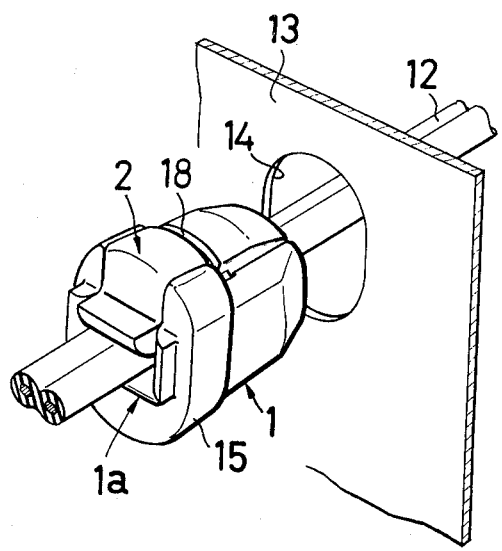
FIG. 4 is a perspective view of the grommet in its assembled state.
Figure 5:
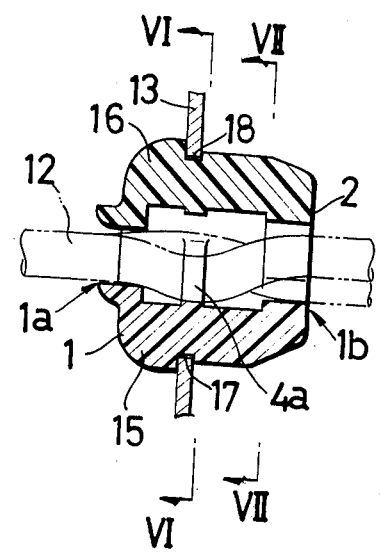
FIG. 5 is a longitudinal cross section of the grommet of FIG. 4.
Figure 6:
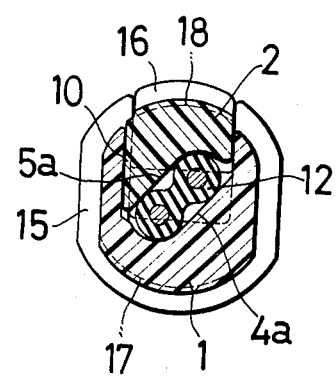
FIG. 6 is a lateral cross section taken along the line VI—VI in FIG. 5.
Figure 7:
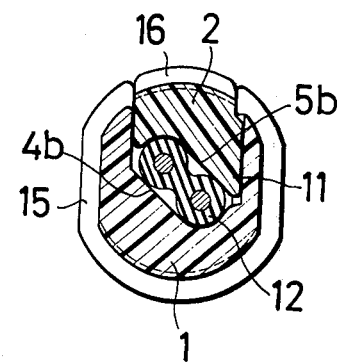
FIG. 7 is a lateral cross section taken along the line VII—VII of FIG. 5.

DESCRIPTION OF THE PREFERRED EMBODIMENT:

In the grommet of the illustrated preferred embodiment, in order that the two members 1 and 2 may be easily coupled and accurately brought into mutual engagement, one member 1 is shaped in a female form by incorporating a U groove 3 in the longitudinal direction and the other member 2 is shaped in a male form shaped to enter said groove 3 so that the two members can be coupled in fitting engagement.

In said female member 1, a pair of inclined protrusions 4a and 4b of which the inclined edges, when observed in front elevation, cross each other substantially perpendicularly extend from the bottom of the groove 3. In the male member 2, a pair of inclined protrusions 5a and 5b of which the directions of the inclined edges similarly cross each other substantially perpendicularly so as to match the inclined protrusions of the female member are formed on the underside.

FIG. 1 and FIG. 2 clearly illustrate the relationship between the aforementioned pairs of inclined protrusions. The two inclined protrusions disposed in the female member are separated from each other by having one inclined protrusion 4a positioned approximately in the middle of the length of the groove 3 and the other inclined protrusion 4b positioned at the opening on the forward side 1b of the member. As illustrated in FIG. 2, the one inclined protrusion 4a decreases in height to the left and the other inclined protrusion 4b decreases in height to the right so that the inclined edges, when observed in front elevation, cross perpendicularly inside the groove 3. FIG. 2 represents a view taken from the rear side. When the grommet is viewed from the far end 1a of the member, namely from the front side, the inclined protrusions are slanted in the opposite directions from those illustrated herein.

In contrast to the female member of such construction, the male member has the two inclined protrusions 5a and 5b formed, as illustrated in a separated state in FIG. 1, so that their respective inclined edges run parallelly with the inclined edges of the inclined protrusions 4a and 4b of the aforementioned female member; the inclined protrusion 5a positioned at the middle decreases in height to the right and the other inclined protrusion 5b decreases in height to the left, with the result that the inclined edges thereof perpendicularly cross each other in front elevation similarly to the inclined protrusions in the female member.

When the aforementioned two members 1 and 2 are placed opposite each other as illustrated in FIG. 2, therefore, the inclined protrusions disposed on the members assume such a relative position that the inclined protrusions of the pair 4a and 5a and the pair 4b and 5b confront each other and the inclined protrusins in mutual confrontation have their inclined edges run parallelly with each other. When the male member is inserted into the groove 3 and brought into fast engagement with the female member, the inclined protrusions in each confronting pair can be made to approach closely throughout their entire length.

In this particular preferred embodiment, guide grooves 8 and 9 are formed in the longitudinal direction in the rising wall faces 6 and 7 of the groove 3 and ridges 10 and 11 are formed on the lateral edges of the inclined protrusions of the male member. When the two members are coupled, said ridges are fitted into said guide grooves so that the sliding engagement thereof enables the male member to slide perpendicularly into position accurately and the inclined protrusions in each confronting pair to closely approach each other.

When the two (one male and one female) members having a construction such as is described above are brought into embracing engagement with a cord 12 lodged inside the groove 3, the coupled members assume an overall outside diameter enough for them to be inserted, without requiring any further action, through the perforation 14 bored in the panel 13 such as a chassis. The outer diameter is slightly smaller on the forward end side to facilitate the insertion of the assembled grommet into said perforation 14. On the outer face at the rear end side, there are formed flanges 15 and 16. When the assembled grommet is pushed through the perforation 14, these flanges collide into the edge on the front side of the perforation and prevent the assembled grommet from passing all the way through the panel. On the outer face in front of the flanges, annular grooves 17 and 18 are formed along the lines in which the flanges rise. These annular grooves are adapted to receive the edge of the perforation so that the two members pushed into engagement with the panel will not come loose.

Now a description will be made of a case in which a given cord is fastened with said two members. The cord 12 is passed through the perforation 14 in the panel. Then in front of the panel, the female member 1 is held upwardly from below the cord and raised to receive the cord in the groove 3. After that, the male member 2 is held downwardly from above the cord and the ridges 10 and 11 formed on the lateral edges of the inclined protrusions 5a and 5b extended downwardly from the underside of the male member are slid into the guide grooves 8 and 9 formed on the wall faces of the groove 3. The male member is fitted into the groove 3 by virtue of the sliding engagement of said ridges with said guide grooves to couple the two members. When the male and female members are coupled as described above, the inclined protrusions 4a, 4b, 5a and 5b formed on the two members are made to closely approach each other inside the groove 3, with the result that the close approach of the inclined protrusions in each confronting pair presses the cord laid in the groove beforehand and twists it in their respective directions of inclination. Since in this particular preferred embodiment, the directions of the inclined edges of the longitudinally separated inclined protrusions cross each other when observed in front elevation, the cord inside the groove 3 is pinched between the pair of 4a and 5a and the pair of 4b and 5b respectively of the inclined protrusions and, at the same time, is forcibly twisted by an angle of 90°.

After the cord has been held fast between the two members as described above, the two members in their coupled form are forcibly inserted through the perforation bored in said panel until the edge of the perforation is received in the annular grooves 17 and 18 formed on the outer face of the two members. Thus, the fastening of the cord to the panel is completed.

In the present preferred embodiment, the opening 19 on the rear end side 1a of the female member 1 is given a greater dimension in the horizontal direction than in the vertical direction so that the cord at the entrance into the groove 3 is held fast in its horizontal position when the male member is brought into engagement with the female member, with the result that the cord is additionally twisted by an angle of about 45° between said opening and the middle point at which the inclined protrusions 4a and 5a approach closely.

The present invention has been described with reference to the illustrated preferred embodiment. As described above, the grommet of the present invention can prevent the cord from moving freely in the direction of its length and can fasten the cord to the panel with ample fastness because the cord passed between the male and female members is gripped fast by the close engagement of said two members and the contact of the cord and the two members is enhanced by the forcible twist given to the cord in the limited space in which the cord passes the two members.

Furthermore in this invention, the cord is twisted in opposite directions by means of the front and rear inclined protrusions of which the directions of the inclined edges, when observed in front elevation, cross each other. The desired coupling of the female and male members, therefore, can be accomplished by applying to the two members equal force on the left and right sides, thus enabling the work of coupling to be carried out easily. In addition, this invention enjoys another advantage in that the two members are coupled so fast that they will not be caused to separate from each other owing to the reactional force exerted by the cord.

Although in the preferred embodiment dealt with above, the two members are formed independently of each other, they may be formed in a unitary construction having the two members connected by a hinge or a cord. The grommet of this construction proves to be advantageous because the two members can always be handled as a set.

What is claimed is:

1. A grommet, which comprises a pair of members, one of said pair of members being possessed of a U groove and provided at the bottom of said groove with a pair of inclined protrusions of which the directions of the inclined edges, when observed in front elevation, cross each other substantially perpendicularly and the other member being adapted to be coupled into fitting engagement with said U groove and provided with a pair of inclined protrusions of which the directions of the inclined edges, when observed in front elevation, cross each other substantially perpendicularly in such a way that, when the latter member is inserted into the fitting engagement with said U groove, said inclined protrusions confront the pair of inclined protrusions formed on the bottom of the former member, whereby a cord interposed between said two members is gripped fast in a twisted state because of the crossed relationship of the inclined edges of the pairs of inclined protrusions when the two members are pressed against each other into fitting engagement.

* * * * *